United States Patent
Satish et al.

(10) Patent No.: US 7,831,522 B1
(45) Date of Patent: Nov. 9, 2010

(54) EVALUATING RELYING PARTIES

(75) Inventors: Sourabh Satish, Fremont, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 1077 days.

(21) Appl. No.: 11/540,999

(22) Filed: Sep. 28, 2006

(51) Int. Cl.
*G06Q 20/00* (2006.01)
(52) U.S. Cl. ............................ 705/76; 705/1
(58) Field of Classification Search ............ 705/76, 705/1
See application file for complete search history.

(56) References Cited

U.S. PATENT DOCUMENTS

| | | | |
|---|---|---|---|
| 7,559,087 B2 * | 7/2009 | Pai et al. | 726/25 |
| 2005/0172335 A1 * | 8/2005 | Aday et al. | 726/10 |
| 2007/0022090 A1 * | 1/2007 | Graham | 707/1 |
| 2007/0294431 A1 * | 12/2007 | Adelman et al. | 709/245 |

\* cited by examiner

*Primary Examiner*—Pierre E Elisca
(74) *Attorney, Agent, or Firm*—Hunton & Williams LLP

(57) ABSTRACT

Determining reputation information is disclosed. A honey token is included in an online identity data. The honey token is to monitor for misuse of all or part of the online identity data. Optionally, information associated with at least one use of the honey token is aggregated with other reputation information.

3 Claims, 8 Drawing Sheets

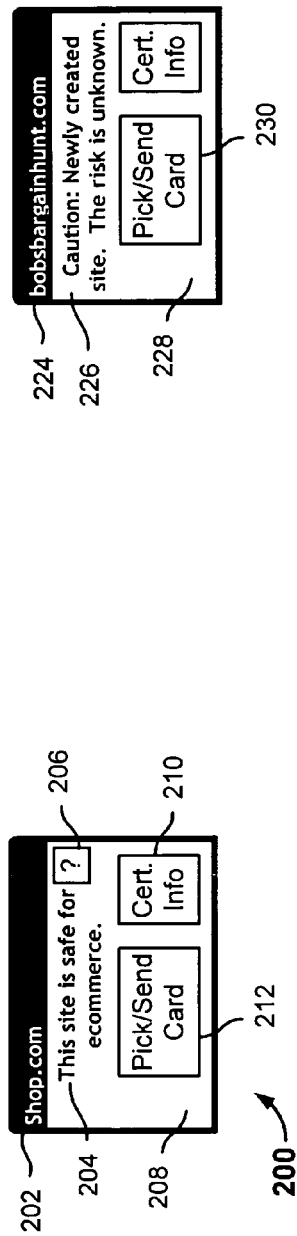
FIG. 2A
FIG. 2B
FIG. 2C
FIG. 2D

```
<OBJECT type="application/x-informationCard" name="xmlToken">
    ...
<PARAM Name="requiredClaims" Value=
    "...emailaddress"
     ...givenname"
     ...creditcard"
     ...surname"/>
<PARAM Name="optionalClaims" Value=
    "...postalcode"
     ...occupation"
     ...dateofbirth"/>
    ...
</OBJECT>
```

302 — requiredClaims group (emailaddress, givenname, creditcard, surname)
304 — optionalClaims group (postalcode, occupation, dateofbirth)
306 — OBJECT tag
300 — overall

FIG. 3

EVALUATING RELYING PARTIES

BACKGROUND OF THE INVENTION

The collection and compromise of users' personal information is increasingly a goal of attackers who can use the information for unauthorized (and oftentimes fraudulent) purposes. One way that attackers obtain this information is by perpetrating phishing scams. For example, by creating a phishing site that mimics a genuine site, an attacker may be able to confuse a victim into providing a login and password that can later be used by the attacker to impersonate the victim and gain admission to the genuine site. Attackers can also use phishing techniques to solicit and obtain financial information (such as credit card or bank account numbers) and/or other personal information (such as home address, phone number, or email address) directly from an unsuspecting user.

One approach to combating phishing is to educate users to check the sites they visit for valid digital certificates. As users become more sophisticated, however, so too do the attackers who then obtain certificates (issued, for example, with a domain name similar to the genuine site). Another approach to protecting users is the use of tools that act as intermediaries to authenticate users to third party sites. Unfortunately, one result of using such a tool is that users can have less control over when and what information is submitted, and less visibility into how their personal information is used than if they manually entered that information into the third party site.

Legitimate sites may also inappropriately leak personal information about users. For example, while a site may have a stated privacy policy of not disclosing user email addresses to third parties, the site may ignore that policy. Similarly, while a site may claim to guarantee the safety of submitted customer payment information, the site may be compromised by a hacker and expose personal information in an unauthorized manner.

Therefore, it would be desirable to have a better way to inform trust decisions.

BRIEF DESCRIPTION OF THE DRAWINGS

Various embodiments of the invention are disclosed in the following detailed description and the accompanying drawings

FIG. 2A illustrates an embodiment of an interface providing reputation information.

FIG. 2B illustrates an embodiment of an interface providing reputation information.

FIG. 2C illustrates an embodiment of an interface providing reputation information.

FIG. 2D illustrates an embodiment of an interface providing reputation information.

FIG. 3 illustrates a representation of a portion of information included in a policy.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
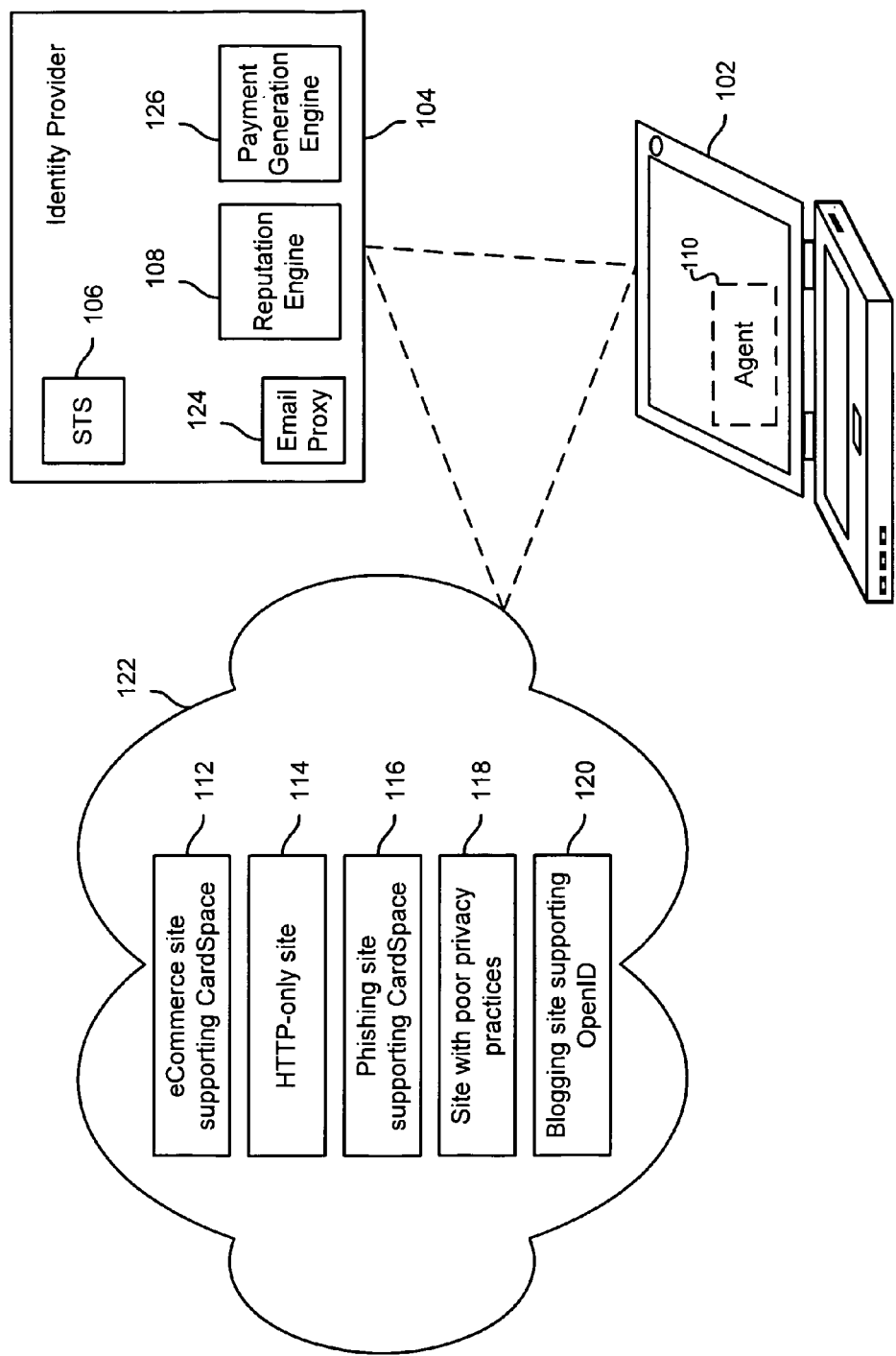
FIG. 1 is a diagram illustrating an embodiment of an environment having identity management.

FIG. 1 is a diagram illustrating an embodiment of an environment having identity management. In some embodiments network 122 includes the Internet or a portion thereof. In some embodiments, network 122 includes a plurality of networks and/or includes one or more intranets.

In the example shown, user 102 communicates (e.g., with a web browser) with various sites in network 122 (also referred to herein as "hosts" 122). In some cases, a site is hosted on a single server. In other cases, such as for load balancing reasons, a site may be replicated or split across multiple servers (or other hardware).

Some of the sites in network 122 request that user 102 authenticate in some manner to that site, such as before granting user 102 access to particular services. Sites that request identity related information from users are also referred to herein as "relying parties."

In the example shown, site 112 is an electronic commerce site that supports the Windows CardSpace framework (formerly known as "InfoCard"). Site 114 is a message board with plain text password support and site 120 is a blogging site that supports the OpenID framework. Site 116 is a phishing site that supports the Windows CardSpace framework. The sole purpose of site 116 is to collect and ultimately facilitate the misuse of information provided by unsuspecting visitors. Additional sites in network 122 support other identity meta-systems (also referred to herein as "authentication frameworks") such as Meebo, Sxip, Google TPass, and Verisign Personal Identity Provider (not shown).

Suppose user 102 wishes to purchase an item from site 112. After adding the item to a cart, the user selects a checkout button and is directed to a login/registration page. Included in the page (e.g. as embedded XML) is a set of security token requirements (collectively referred to herein as a "policy") that specify supported token types and one or more claims that site 112 would like satisfied. As used herein in the context of identity management, "claim" or "claims" refer to a request for identity information and/or other personal/sensitive information (such as "name," "address," "age," "bank account number," "membership level," "insurance ID," etc.) Claims are sometimes referred to herein as "credential requests," since the term "claim" in this context comprises a request that identity and/or other private information be provided. The particular values associated with the claims (e.g., "jsmith@symantec.com" and "ID#12343826") are referred to herein as "credentials" and "credential values" interchangeably. The policy is received by agent 110.

In the example shown, agent 110 is a software component that is configured to support the CardSpace framework. Agent 110 can be adapted to support other authentication frameworks as applicable. Agent 110 acts on behalf of user 102 to interact with relying parties and identity providers such as identity provider 104. As described in more detail below, agent 110 can also help inform user 102 about the reputations of various sites in network 122 and facilitate the insertion of honey tokens into information relayed to relying parties.

In some embodiments, agent 110 is natively included in a web browser, is a browser plugin, or is otherwise integrated with a browser. In some embodiments, agent 110 is a standalone application or included in a standalone application. In some embodiments, the functionality of agent 110 is provided by multiple applications or components working in conjunction. For example, agent 110 may provide information to a web browser for rendering to user 102 rather than rendering it directly.

After receiving the policy from site 112, agent 110 displays information about site 112's digital certificate to user 102. Agent 110 then presents to user 102 a digital wallet from which user 102 can select a card that will satisfy the claims (and token types) requested by site 112. In some embodiments, agent 110 provides a digital experience to user 102 that is conceptually similar to reaching into a wallet to find a membership card when renting a video, or a driver's license with proof of age when purchasing alcohol or tobacco products. Agent 110 can also help facilitate user 102 obtain a new card, such as from identity provider 104.

The cards stored with user 102 generally contain meta-information about user 102, but do not contain the underlying credential values. For example, cards held by user 102 may include fields such as "last name" and "phone number," only, while identity provider 104 securely stores information such as "Jones" and "555-555-1212." One way that a card is obtained is by user 102 visiting identity provider 104 (e.g., with a browser), establishing an account, and then providing credential information to identity provider 104 for later use. Identity provider 104 then issues one or more cards (e.g., .cid files) to user 102 to be stored and used by agent 110.

After user 102 selects a card, agent 110 contacts identity provider 104 and requests a token (also referred to herein as a "security token") that will satisfy site 112's policy (also referred to herein as a "claim certification"). Agent 110 then optionally displays the information that will be conveyed to site 112 (e.g., Last Name=Jones, Age=20, etc.) and asks user 102 to confirm that the information should be submitted to site 112. If the user confirms that the information should be given to site 112, agent 110 submits the token to site 112. Sometimes, such as when the token type is SAML 2.0, the token provided by agent 110 to site 112 on behalf of user 102 does not contain credential values. In that case, after receiving the token, site 112 would contact identity provider 104 to obtain additional information. Once site 112 has received the required credentials, user 102 is authenticated and granted access, e.g., to an order confirmation screen.

In the example shown, identity provider 104 supports the CardSpace framework. In various embodiments, identity provider 104 supports other identity meta-systems in addition to or instead of CardSpace and the techniques described herein are adapted accordingly. Identity provider 104 includes security token service 106 which issues security tokens, such as to agent 110. In addition, identity provider 104 includes a variety of modules such as reputation engine 108, e-mail proxy 124, and payment generation engine 126 described in more detail below. Reputation engine 108 processes reputation information associated with sites in network 122.

In some embodiments, the infrastructure provided by portions of identity provider 104 is located on and/or replicated across a plurality of servers rather than the entirety of identity provider 104 being co-located on a single platform.

FIG. 2A illustrates an embodiment of an interface providing reputation information. The example shown includes information provided to user 102 by agent 110 to help user 102 determine whether and what information the user should disclose to site 112. When site 112 responds with a policy to be satisfied (e.g., after user 102 selects a checkout button), agent 110 presents interface 200 to user 102, from which user 102 can select a card that satisfies site 112's request (by selecting region 212).

Region 202 indicates the address of site 112. Region 210 presents digital certificate information typically displayed in the CardSpace framework, including the name, location, website URL, and logo associated with the website, along with the name and logo of the issuing certificate authority.

Interface 200 also displays additional information to help user 102 make an informed decision about whether to transact with site 112. For example, the certificate information shown in region 210 can be augmented with information such as how long ago the website and/or certificate was created. In some embodiments, the information shown in region 210 is simplified, such as by displaying a star rating that indicates whether the certificate is a High Assurance certificate (shown as 5 stars), a certificate issued by a lesser-known certificate authority (3 stars), or a self signed certificate (1 star), and other details about the certificate are hidden.

Other regions of interface 200 also indicate information associated with the reputation of the site. For example, based on information provided by reputation engine 108, region 208 may display a color (such as green) to indicate that site 112 is not known to pose any risk. Similarly, region 204 may indicate a message to user 102 indicating a specific recommendation about site 112. In the example shown, the message indicates to user 102 that site 112 is not a phishing site and that user 102 should feel safe to share financial details with site 112. In some embodiments, other indicators are included in region 208 and/or region 204. For example, particular icons indicating types of threats (e.g., a picture of an envelope or a dollar sign), sound samples (such as a buzzer or a siren), and spoken words (such as "do not visit this site" or "all clear") may be used as indicators.

By selecting region 206, user 102 can see the specific reasons behind the recommendations made in region 204 and/or displayed in region 208. For example, a site may be described as safe for ecommerce if it is known to use a reputable payment transaction system and has had no breaches in the last year. A site may be described as safe for personal information if it is known to adhere to best practices for managing user personal information.

Reputation engine 108 leverages and aggregates information provided by a variety of modules that may be internal or external to identity provider 104. For example, reputation engine 108 can receive indications of whether a site has been known to generate spam from a standalone anti-spam solution such as BrightMail. Reputation engine 108 can also receive indications of whether a site is known to host malware, is known to transmit spyware, etc. from sources such as the DeepSight Threat Management System that aggregates security incident information from sources and attack sensors worldwide, and the SafeSearch infrastructure that crawls network 122 looking for malicious content and nefarious embedded links. Information about website policies and user/customer satisfaction, such as may be collected by entities such as SiteAdvisor or BizRate (also referred to herein as third party site rating sources) can also be included. In some embodiments, reputation information can be further customized such as by user 102 or by an administrator affiliated with user 102. For example, businesses located in jurisdictions with laws that require the mandatory disclosure of breaches of personal information may receive higher scores than jurisdictions which do not.

In some embodiments, the determination of whether, e.g., to show a green or a red background in region 208 is determined by reputation engine 108 and pushed to agent 110. In some embodiments, reputation engine shares scores or other metrics with agent 110 and agent 110 can be configured to display different information based on thresholds set by an administrator of agent 110.

As described in more detail below, the indications made in regions 208 and 204 are dynamic. For example, if reputation engine 108 subsequently learns that a site has been compromised, the next time user 102 visits the site, a different message will be displayed.

FIG. 2B illustrates an embodiment of an interface providing reputation information. The example shown includes information provided to user 102 by agent 110 to help user 102 determine whether and what information the user should disclose to a site (224) that supports the CardSpace framework and has a valid digital certificate, but about which little additional information is known. In this example, region 228 is colored yellow to indicate that the user should be cautious when deciding to share personal information with site 224, and region 226 indicates the reason for that caution (the site was recently created and reputation engine 108 is unaware of information that would help determine the site's reputation).

It is possible that site 224 poses no risk to user 102. As described in more detail below, over time, and as more users interact with site 224 and do not have negative experiences, reputation engine 108 will develop positive reputation information for site 224. Subsequent visitors making use of an agent such as agent 110 would then be presented with a green background in region 228 and a positive notice in region 226 as applicable.

Unfortunately, it is also possible that site 224 is like site 116, a fly-by-night operation created in the hopes of confusing users into submitting personal details by appearing to be a plausible ecommerce site with CardSpace support. As described in more detail below, in addition to providing indications to user 102 to proceed with caution when accessing site 224, agent 110 can help protect user 102's information through the use of honey tokens.

FIG. 2C illustrates an embodiment of an interface providing reputation information. The example shown includes information provided to user 102 by agent 110 to help user 102 determine whether and what information the user should disclose to site 250.

In the example shown, site 250 is a phishing site sophisticated enough to have a digital certificate, but not making use of the CardSpace framework or other identity meta-system. Agent 110 is nonetheless able to warn user 102, with a red background in region 254 and an appropriate message in region 252 that site 250 poses a serious threat to user 102's personal information. Agent 110 can similarly provide information on websites which do not make use of digital certificates, such as site 114, as well as sites with identity meta-systems that are not supported by identity provider 104. By selecting region 256 of the interface shown in FIG. 2C, user can view statistical or other information that factored into site 250's reputation.

FIG. 2D illustrates an embodiment of an interface providing reputation information. The example shown includes information provided to user 102 by agent 110 to help user 102 determine whether and what information the user should disclose to a site, such as site 118, that is known to sell or otherwise not keep private visitor email address information. In the example shown, region 278 is red and message 276 indicates a risk to user 102. Suppose the site shown in FIG. 2D contains funny jokes that user 102 would like to read. The site supports the CardSpace framework and requires that visitors authenticate themselves to the website, including by providing email address, zip code, and full name. The site collects the information to distinguish visitors, who are allowed to post and comment on the content provided at the site. However, the site does not have a stated privacy policy and has been known to share user information with third parties.

As described in more detail below, when selecting region 280, agent 110 will help user 102 select credentials that can be provided to the site while maintaining user 102's privacy and security.

FIG. 3 illustrates a representation of a portion of information included in a policy. Policy 300 is received by agent 110 when user 102 attempts to access a login screen located at site 224. As described above, site 224 was recently created and reputation engine 108 has little if any information on whether the site is a phishing site or otherwise poses a threat to user 102's personal information.

The received policy includes a request for four mandatory credentials 302 (email address, first name, credit card number, and last name) and three optional credentials 304 (ZIP code, occupation, and date of birth). The policy also states the specific token type that is supported (306).

Figure 4:
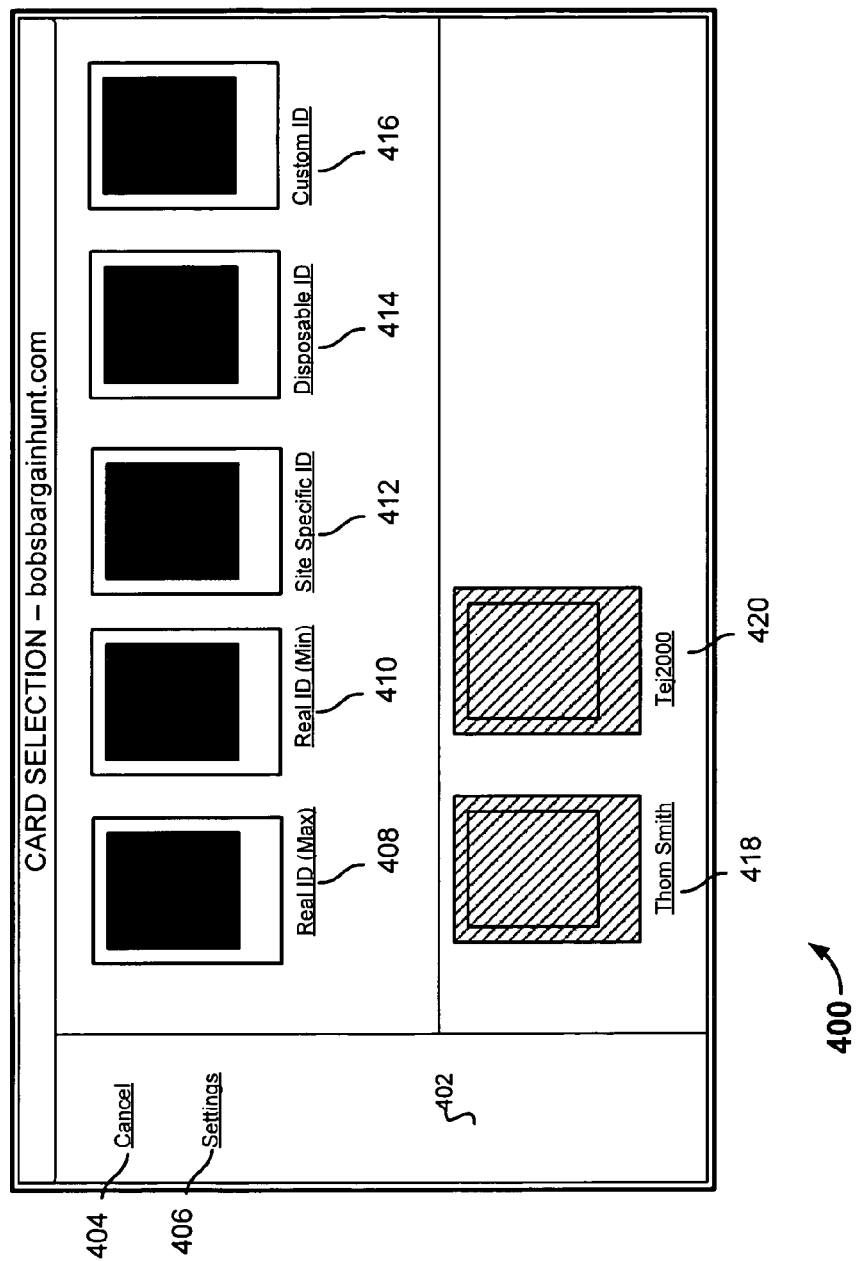
FIG. 4 illustrates an embodiment of a credential selection interface as rendered in a browser.

FIG. 4 illustrates an embodiment of a credential selection interface as rendered in a browser. As described above, in some embodiments, when a user, such as user 102 receives a policy from a site, such as site 224, agent 110 provides reputation information to user 102 about that site.

In the example shown, user 102 has selected region 230 of the interface shown in FIG. 2B, indicating that the user would like to authenticate to the site (to provide some form of credentials).

Region 402 of interface 400 provides user 102 with assorted options such as the ability to cancel out of the authentication transaction (404) and specify variety of settings (406) including default actions to take with respect to site 224, default actions to take with respect to websites with similar reputations, default behavior when selecting cards, etc.

In the example shown, several different identity options (represented by cards 408-420) are presented. CardSpace policies, such as the one shown in FIG. 3, can include both required and optional claims. Cards associated with a set of credentials that satisfies at least the required claims of a site may be selected by clicking on that card. Cards associated with an insufficient credential set are grayed out and not selectable (418 and 420).

User 102 would like to send a set of credentials to site 224 and thus gain admission to the services offered by the site. In some embodiments, the default behavior of clicking on a particular card is selectable by the user such as through use of link 406. For example, user 102 could specify a global policy that optional credentials never be submitted. User 102 could also specify different behaviors for different cards. As described in more detail below, user 102 may specify that when the user selects card 410, only the minimum set of credentials required to satisfy the policy be provided, but when the user selects card 408, all claims (including both required and any optional claims) be satisfied. Cards 408 and 410 are both associated with user 102's "real" identity. In selecting either card in response to the policy of site 224, user 102's real first and last name, primary email address, and credit card information would be provided to a relying party. If user 102 selected card 408, that user's ZIP code, occupation, and date of birth (optional claims) would also be conveyed to site 224. User 102 might typically select card 408 or 410 when enrolling in a reputable hotel or airline loyalty program online, or with a reputable bill payment service.

If the user selects card 414, wholly fictitious information will be supplied to site 224. User 102 might typically select card 414 when the user knows the site poses a threat but wants to visit it nonetheless (e.g., because the user has received an email from a relative inviting the user to view a funny picture). If the user selects card 416, the user can specify which optional credentials, in addition to the mandatory credentials, should be supplied to site 224.

If the user selects card 412, certain customizable site specific credentials will be included by identity provider 104 in the token to be sent to site 224. In the example shown, identity provider 104 supports the creation of two site-specific credentials—a site specific email address, and (e.g., by partnering with a credit card issuer) a site specific credit card number. Thus, when user 102 clicks on card 412, site 224 will ultimately receive user 102's true first and last name, as well as a valid email address and credit card number which are linked with site 224.

As used herein, the site-specific email address and credit card number are a type of honey token—their use by the relying party can be traced to the relying party and that use can be used to identify whether site 224 safeguards identity information or misuses it in some fashion. Other example of honey tokens include bogus email addresses (such as are used when the user selects card 414), fictitious phone numbers, and other information. In some embodiments, identity provider 104 is configured to include fields in excess of the required claims. It may, for example, include a fictitious spouse name or place of birth when that information is not asked for by the relying party.

As described in more detail below, if the receiving party or any other third party later attempts to make use of the tracked data, it can be noted, and the access can be determined to be legitimate or not. If necessary or desired, the user can be alerted and/other remedial steps may be taken.

Cards 418 and 420 in FIG. 4 correspond with two personas of user 102. User 102 uses the first (card 418) as a realistic pseudonym. Card 418 is used when user 102 visits and participates in medical support group forums. Card 418 does not have a credit card associated with it and thus cannot be used (without modification) to satisfy policy 300. Card 420 corresponds with a persona that user 102 uses to log into social networking sites, movie discussion groups, etc., where the only credentials that will be supplied include a first name and a free email address.

In some embodiments, interface 400 is shown to user 102 every time agent 110 receives a policy such as policy 300. In the example shown, user 406 can customize default behavior such as "present the card again next time without asking" and "only prompt me to select a card if the reputation of the site to which it is being submitted has changed." If a site that agent 110 initially considers trustworthy is revealed to engage in misuse of information, the user can configure identity provider 104 (via agent 110) to substitute a card such as card 410 with a card such as card 412 or 414. Correspondingly, if a site that user 102 initially views skeptically is later determined to be trustworthy, the user can configure identity provider 104 to substitute a card such as card 414 with card 412 or 410.

Figure 5:
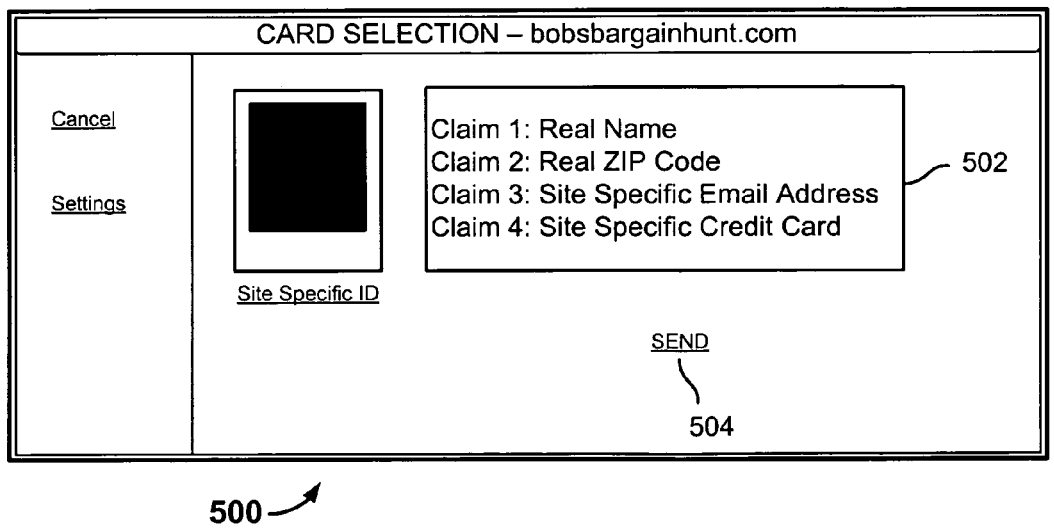
FIG. 5 illustrates an embodiment of a credential selection interface as rendered in a browser.

FIG. 5 illustrates an embodiment of a credential selection interface as rendered in a browser. In the example shown, user 102 selected card 412 in FIG. 4 and agent 110 requested a corresponding security token from identity provider 104. Interface 500 is a confirmation screen that allows user 102 to review the credentials that will be sent to site 224. In the example shown, a summary of what will be sent (but not the specific credential values) is displayed. In various embodiments; when requesting a security token from identity provider 104, agent 110 also requests a display token. In such case, the credential values that will be submitted when user 102 selects send (504) will be displayed in region 502.

In some embodiments, portions of the interactions described in conjunction with FIGS. 4 and 5 occur transparently to the user or with minimal user input. For example, an administrator may specify certain default behaviors (e.g., "never send real identity information to the following black-listed sites," or "if the site is our corporate site, always send the card with the most complete credentials.").

Figure 6:
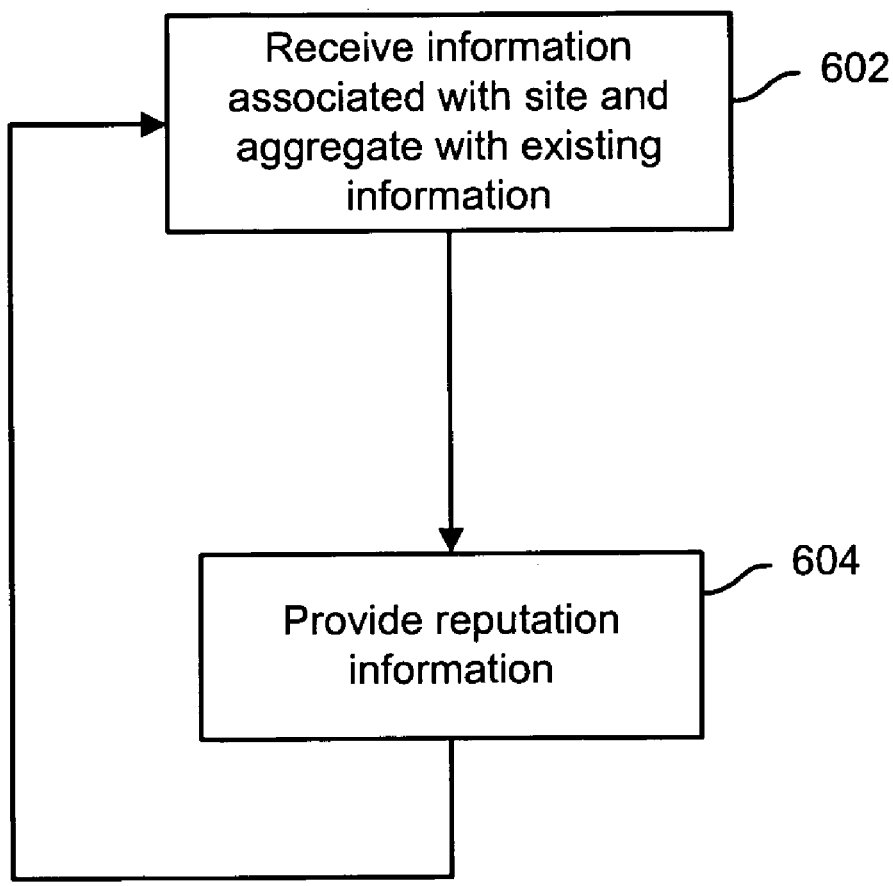
FIG. 6 is a flow chart illustrating an embodiment of a process for providing reputation information.

FIG. 6 is a flow chart illustrating an embodiment of a process for providing reputation information. In the example shown, the process is implemented by identity provider 104. The process begins at 602 when information associated with a site is received. For example at 602, identity provider 104 receives reports from DeepSight, Brightmail, or other infrastructure. As described in more detail below, misuse of honey token information is also received at 602, such as from mail proxy 124. The received information is aggregated with existing information known about the site.

At 604, the aggregated information or, e.g., a numerical representation thereof is provided. In some embodiments, if a site's reputation changes between a first time and a second time, specified actions may be taken. For example, if a site's reputation decreases significantly, an alert can be sent by identity provider 104 notifying users who requested security tokens for use with that site in the last month of the change. Agent 110 can also be configured to provide notices to users in other ways such as the next time they make use of agent 110.

As described in more detail below, identity provider 104 can also be configured to substitute one or more credentials for another. Suppose, for example, identity provider 104 learns at 602 (e.g., via DeepSight) that a site previously considered to be safe has been the recent subject of several malicious attacks. Even if those attacks have not yet been successful, identity provider 104 may assist user 102 (via agent 110) in providing a different set of credentials the next time the user accesses that site. In some cases, the credentials are automatically substituted based on a threshold, and no specific cooperation from the user is required.

Similarly, if a site's reputation changes for the better (e.g., from being an unknown or recently created site to one that has received several positive ratings from BizRate), identity provider 104 may assist user 102 in providing more complete credentials (e.g., a home and a business phone number instead of just a business phone number) accordingly.

In some embodiments, at least a portion of the processing performed at 602 in FIG. 6 is batched and reputation information is updated periodically (e.g., every week). At least a portion of the processing performed at 602 could also be performed on demand, such as when agent 110 requests reputation information from identity provider 104.

Figure 7:
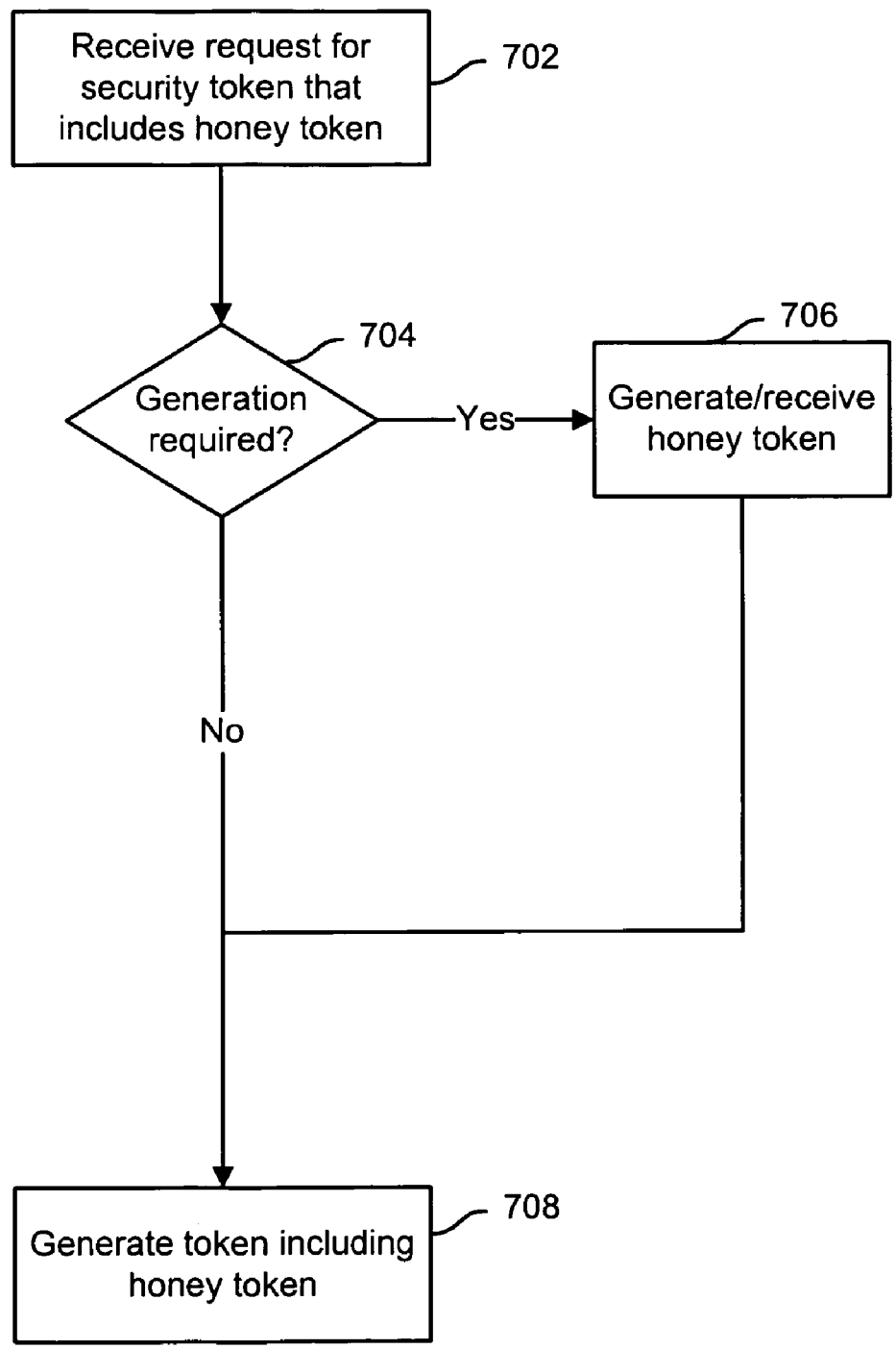
FIG. 7 is a flow chart illustrating an embodiment of a process for generating a security token including a honey token.

FIG. 7 is a flow chart illustrating an embodiment of a process for generating a security token including a honey token. In the example shown, the process is implemented by identity provider 104. The process begins at 702 when a request for a security token is received (such as from agent 110). The request includes an associated indication that the security token should include at least one honey token. In various embodiments, the request for a honey token is embedded in the request for the security token. In some embodiments, identity server 104 is configured to automatically include a honey token in the security token, irrespective of whether agent 110 requests it.

At 704 it is determined whether the honey token requires generation. For example, if the honey token is a routable email address, at 704 it is determined if the email address mapping or other configuration already exists in email proxy 124 (e.g. because user 102 previously communicated with a particular site and the honey token was generated at that previous time). If the honey token is a credit card number, at 704 it is determined if payment generation engine 126 previously generated (or received from a third party) a site-specific credit card number. If not, at 706, the honey token is generated or received as applicable.

In the case of a routable email address, at 706, mail proxy 124 is configured with instructions mapping a first email address (e.g., user 102's primary work email address) to a routable honey token email address. One way to accomplish this is as follows:

When user 102 first begins communicating with identity provider 104, e.g. because user 102 has subscribed to the services offered by identity provider 104, user 102 is assigned an email address such as alice@symantec.com (which user 102 can forward to, e.g., an existing personal or work email address). Email proxy 124 generates addresses that map user 102 and each of the respective sites for which user 102 requires an email honey token by concatenating user 102's account name and the name of the site and hashing that information. For example, a hash of "alice-bobsbargainhunt" might result in a honey token address of sdf7iu237hd83isd62@symantec.com. As described in more detail below, whenever mail is sent to sdf7iu237hd83isd62@symantec.com, identity provider 104 can determine whether it is the relying party sending the mail, or an unauthorized third party and can inform reputation decisions and/or take other remedial action as applicable.

At 708, identity provider generates a security token including the honey token. In some embodiments, the honey token is substituted for an existing claim. E.g., "email address" is replaced by "honey token address." In other cases, the honey token is added as an additional field that was not originally required by the relying party.

Figure 8:
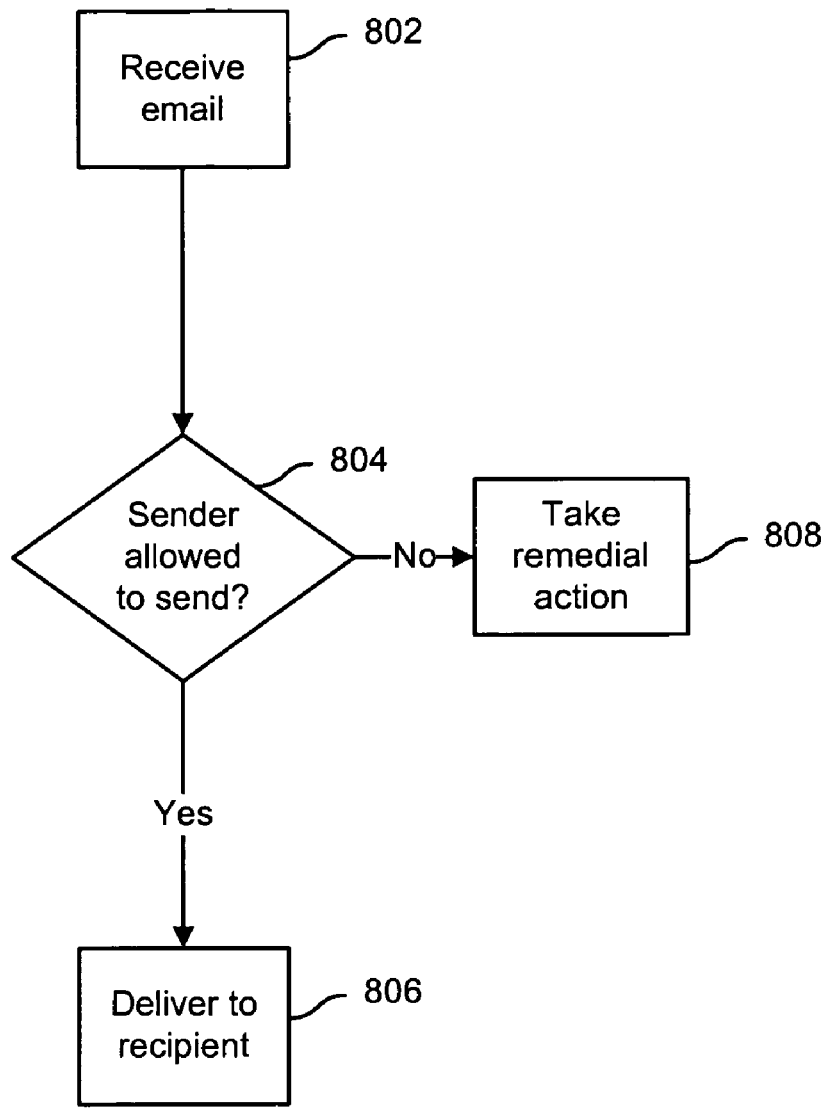
FIG. 8 is a flow chart illustrating an embodiment of a process for detecting the misuse of a honey token.

FIG. 8 is a flow chart illustrating an embodiment of a process for detecting the misuse of a honey token. In the example shown, the process is implemented by identity provider 104 and detects the misuse of an email address. The process shown in FIG. 8 can be adapted to detect the misuse of other honey token information as applicable. In some embodiments, entities external to identity provider 104 perform the detection and/or assist in the detection (such as a Brightmail installation sharing information about leaked honey token phone numbers with identity provider 104).

The process begins at 802 when an email is received, such as by email proxy 124. At 804 it is determined whether the sender of the message is authorized to send to the recipient. In the example honey token described in conjunction with the processing at 706 in FIG. 7, sdf7iu237hd83isd62@symantec.com is the honey token address of a user Alice for use with the site, bobsbargainhunt.com.

If email proxy 124 receives a message for Alice (sent to sdf7iu237hd83isd62@symantec.com) from a different site, such as carolsshoppingstore.com, it is likely that Alice's information has been compromised (e.g., because bosbargainhunt.com sold the information to carolsshoppingstore.com, because a hacker obtained the information and resold it without the permission of bobsbargainhunt.com, or because bobsbargainhunt.com and carolsshoppingstore.com are commonly owned and possibly fraudulent sites).

If multiple domains associated with a site ought to be authorized to send mail to a user, identity provider 104 can be configured accordingly. Such may be the case, for example, where a company legitimately contracts certain tasks (such as billing or providing warranty information) to a third party.

If the message to sdf7iu237hd83isd62@symantec.com was authorized, at 806 the message is delivered to the mapped user, Alice. If, however, there is an indication that Alice's information has been compromised, at 808 a variety of remedial actions can be taken. For example, the suspect message can be delivered to a spam folder for Alice to review. The message can also be deleted or have a header inserted that identifies it as suspect. Additionally, the reputations of both the sending site and the relying party that originally received Alice's honey token email address can be modified accordingly. Other examples of remediation include sending a report to Alice warning her that her honey token email address was compromised, posting the name of the offending relying party on a public bulletin board, and automatically substituting one set of credentials for another as described above. In some embodiments, a threshold level of misuse is applied (e.g., to minimize false positives or negatives). If a certain number of suspect messages are sent to the same person, or are sent to other users by the same relying party, then action can be taken as appropriate.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for informing a trust decision comprising:
   receiving a request at an identity provider for information associated with a trust decision about a host; and
   providing, by the identity provider, information indicating a risk assessment associated with interacting with the host, wherein the risk assessment comprises assessing for at least one of: a risk that financial information submitted to the host will be misused; a risk that identity information submitted to the host will be misused; a risk that the host has been compromised by a third party; and a risk that the host provides an unsatisfactory user experience.

2. The method of claim 1 wherein the information associated with a trust decision about a host includes information received from at least one of: a spam detection module, a phishing detection module, a threat management system, and a third party site rating source.

3. The method of claim 1 further comprising automatically determining one or more credentials to provide to the host based at least in part on the risk assessment.

* * * * *